United States Patent [19]
Ohga et al.

[11] Patent Number: 5,486,141
[45] Date of Patent: Jan. 23, 1996

[54] AMUSEMENT MACHINE AND RECORDING MEDIUM FOR USE IN THE SAME

[75] Inventors: Norio Ohga, Tokyo; Koichi Takeuchi, Kanagawa, both of Japan

[73] Assignee: Sony Corporation, Tokyo, Japan

[21] Appl. No.: 124,009

[22] Filed: Sep. 21, 1993

[30] Foreign Application Priority Data

Sep. 22, 1992 [JP] Japan .................................... 4-278000
May 14, 1993 [JP] Japan .................................... 5-112537

[51] Int. Cl.$^6$ .................................................. A63G 31/16
[52] U.S. Cl. ................................ 472/60; 434/55; 434/59; 434/318
[58] Field of Search ................... 472/59–61; 434/318, 434/55, 59

[56] References Cited

U.S. PATENT DOCUMENTS

| | | | |
|---|---|---|---|
| 1,789,680 | 1/1931 | Gwinnett | 472/60 |
| 3,078,093 | 2/1963 | Hotkins et al. | 472/60 X |
| 3,317,206 | 5/1967 | Holt | 472/60 |
| 3,895,354 | 7/1975 | Kish | 340/172.5 |
| 4,066,256 | 1/1978 | Trumbull | 472/60 |
| 4,461,470 | 7/1984 | Astroth et al. | 472/60 |
| 4,478,407 | 10/1984 | Manabe | 472/60 |
| 4,710,129 | 12/1987 | Newman et al. | 472/60 X |
| 4,749,354 | 6/1988 | Kerman | 434/318 X |
| 4,752,065 | 6/1988 | Trumbull | 472/60 |
| 4,798,376 | 1/1989 | Trumbull | 472/60 |
| 4,856,771 | 8/1989 | Nelson et al. | 472/60 X |
| 4,874,162 | 10/1989 | Trumbull | 472/60 |
| 4,959,734 | 9/1990 | Foster | 434/318 X |
| 4,976,438 | 12/1990 | Tashiro | 273/313 |

Primary Examiner—Carl D. Friedman
Assistant Examiner—Beth A. Aubrey
Attorney, Agent, or Firm—Jay H. Maioli

[57] ABSTRACT

An amusement machine including a display for displaying a picture, motion providing elements for providing a user with motion, a recording medium on which a video signal representing the picture to be displayed on the display and a control signal for controlling the motion providing elements are recorded, and a controller for reproducing the recording medium to control the display and the motion providing elements. The display and the motion providing elements are installed into an amusement unit while the controller for controlling these units is installed in a control center which is located separately from the amusement unit.

11 Claims, 9 Drawing Sheets

AMUSEMENT MACHINE AND RECORDING MEDIUM FOR USE IN THE SAME

BACKGROUND OF THE INVENTION

1. Field of the Invention

This invention relates to an amusement machine for displaying images for an user and enabling the user to be bodily sensate to a motion.

2. Description of Related Art

It has been conventionally utilized in an amusement machine or the like that an image is displayed on a large-scale screen and the user sees the image on the screen while moving a seat on which he sits, thereby allowing the user to have the experience of a space flight or the like.

This technique has been disclosed in U.S. Pat. No. 4,752,065, U.S. Pat. No. 4,798,376, U.S. Pat. No. 3,050,870, U.S. Pat. No. 3,628,829, U.S. Pat. No. 3,469,837, U.S. Pat. No. 4,874,162 and GB2,101,948, for example. A movie film has been used as an image source for these amusement machines as disclosed in the above publications, and a picture and a code for controlling the motion of a seat are recorded on the film.

In such systems, it is required to rewind a movie film every time a picture is projected on a screen. As the time required for the rewinding is longer, an economical load is also larger. That is, in an amusement park or the like, a large number of visitors are replaced one after another to play such an amusement machine, so that if the waiting time for the amusement machine is long, it can not be effectively performed to obtain a large number of visitors for the amusement machine. In addition, when plural picture softwares are provided to a user, the waiting time required between programs makes the user irritated.

Further, the amusement machine itself must be designed in a large-scale, and thus a broad space as required for a cinema or the like is necessary.

Still further, since a large number of visitors see the same story picture, all of the visitors are not necessarily satisfied with the picture.

SUMMARY OF THE INVENTION

This invention has been implemented in view of the foregoing, and a first object of this invention is to provide an equipment for which a user's waiting time can be reduced and visitors can be effectively replaced one after another.

A second object of this invention is to provide an amusement machine which can be easily miniaturized.

A third object of this invention is to provide an amusement machine which can satisfy users individually.

A fourth object of this invention is to provide an amusement machine whose starting and ending operations are rapidly performed.

A fifth object of this invention is to provide a recording medium suitable for the amusement machine as described above.

In order to attain the above and other objects, according to this invention, the amusement machine for displaying a picture for a user and allowing the user to be bodily sensate to a motion, includes a display for displaying the picture, motion providing means for providing a user with motion, a recording medium on which a video signal representing the picture to be displayed on the display and a control signal for controlling the motion providing means, and control means for reproducing the recording medium and controlling the display and the motion providing means, wherein the recording medium comprises a disk-shaped medium, and both of the video signal and the control signal associated with the video signal are recorded as code information on the disk-shaped medium, the video signal and the control signal being synchronized with each other.

It is preferable that the display and the motion providing means are installed in one unit, and these united elements are located separate and away from the control means. Further, the recording medium is preferably composed of an optical disk. In this case, the starting and ending operations of the amusement machine can be immediately carried out.

In the case where the display and the motion providing means are installed in one unit and they are provided independently of and separately from the control means, the amusement machine can be miniaturized to a size corresponding to the control means.

If various recording media having different pictures and motions are prepared, the amusement machine can satisfy various users.

DETAILED DESCRIPTION OF THE INVENTION

Figure 1:
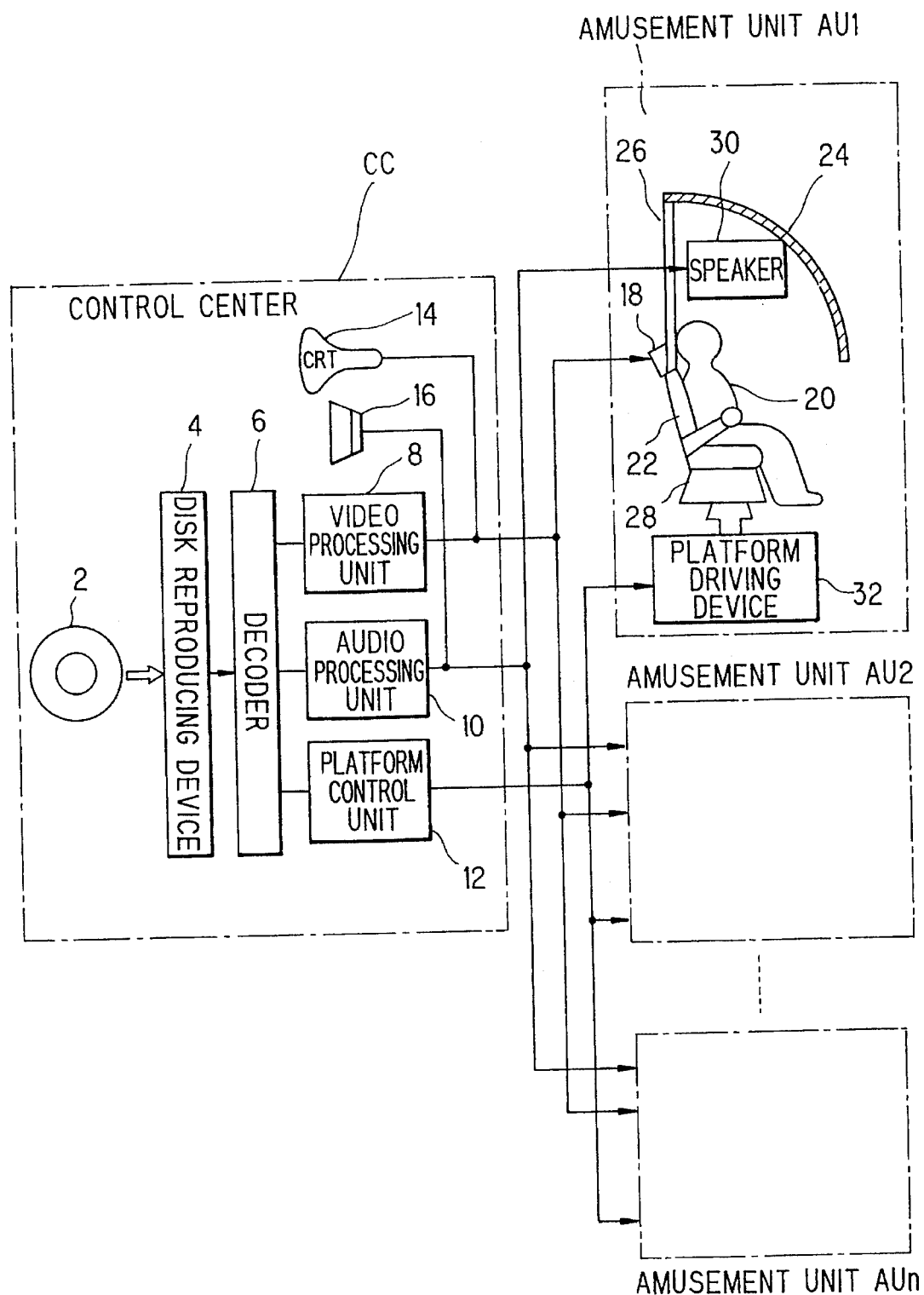
FIG. 1 is a block diagram showing the construction of an embodiment of an amusement system according to this invention.

FIG. 1 is a block diagram showing the construction of an embodiment of an amusement system according to this invention.

Figure 2:
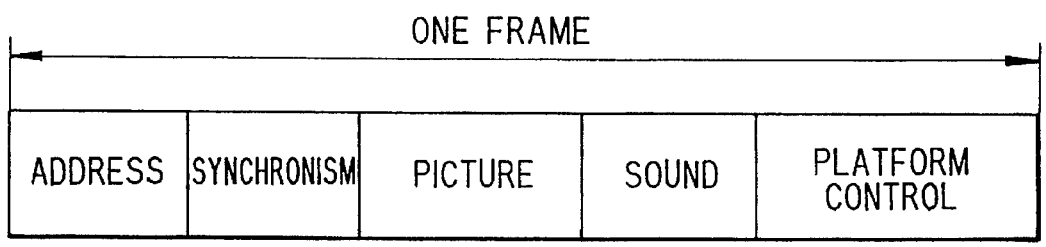
FIG. 2 is a diagram showing a recording format of an optical disk 2 used in the embodiment as shown in FIG. 1.

A control center CC serves to control amusement units AU1, AU2, . . . , AUn having the same construction (n represents an integer above 2). The control center CC is provided with a disk reproducing machine 4 for reproducing an optical disk 2. FIG. 2 is a diagram showing an example of a recording format of the optical disk 2. As shown in FIG. 2, the optical disk 2 is recorded with an address signal, a synchronizing signal, a video code, an audio code and a platform control code frame by frame. The video code is a code representing a picture to be displayed on each of the amusement units AU1 to AUn, and it is obtained by coding a picture which was obtained by photographing with a fisheye lens in order to enable a projection thereof which will be carried out through a fisheye lens. The audio code is obtained by coding 2-channel voice associated with a picture represented by the video code. The platform control code is a code for controlling a platform 28 (as described later) of each amusement unit so that a motion associated with the picture corresponding to the video signal is produced. A decoder 6 serves to decode the coded video code, audio code and platform control code which are output from the disk reproducing machine 4, and output the corresponding video signal, 2-channel audio signal and platform control signal, respectively.

Figure 3:
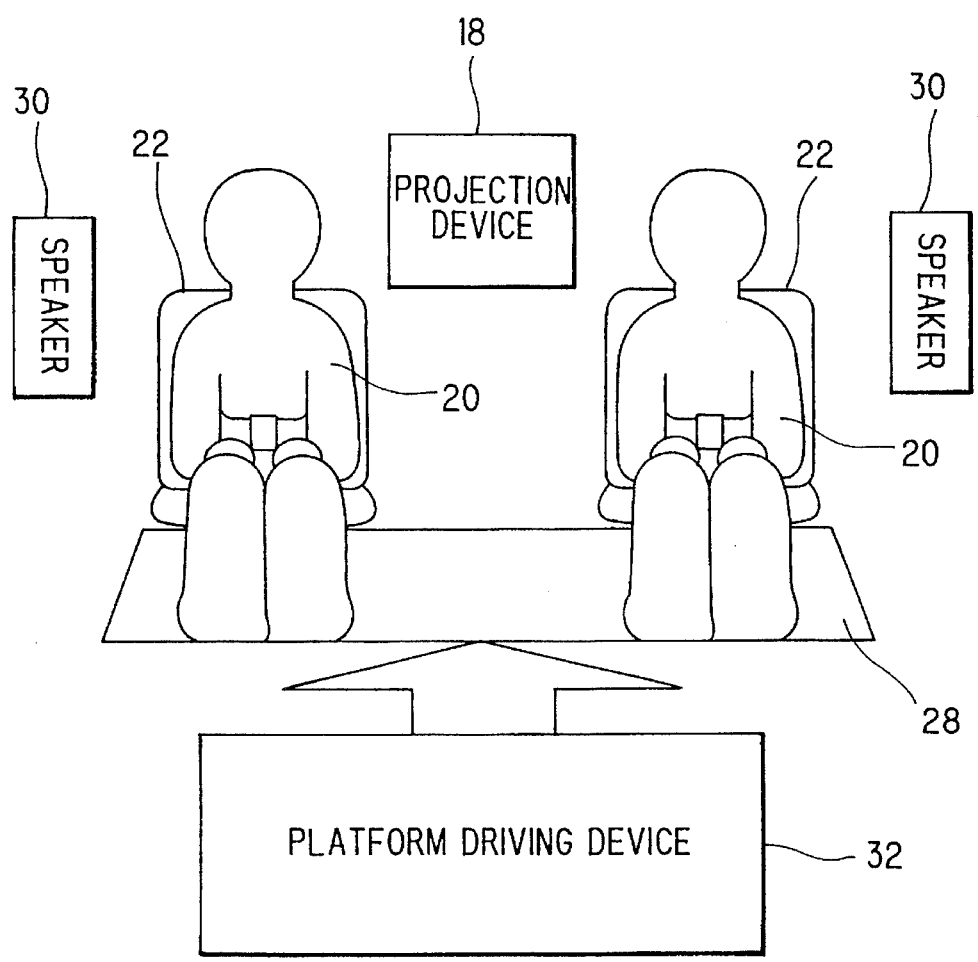
FIG. 3 is a diagram showing the positional relationship between users and a projection machine 20.

A video processing unit 8 conducts a predetermined processing on the input video signal to supply the processed result to a monitor CRT display 14 in the control center CC and to picture projection machines 18 of all the amusement units AU1 to AUn. As shown in FIG. 3, each of the amusement units AU1 to AUn is provided with two seats 22 on which users sit, and the projection machine 18 is disposed between the seats 22.

Figure 4:
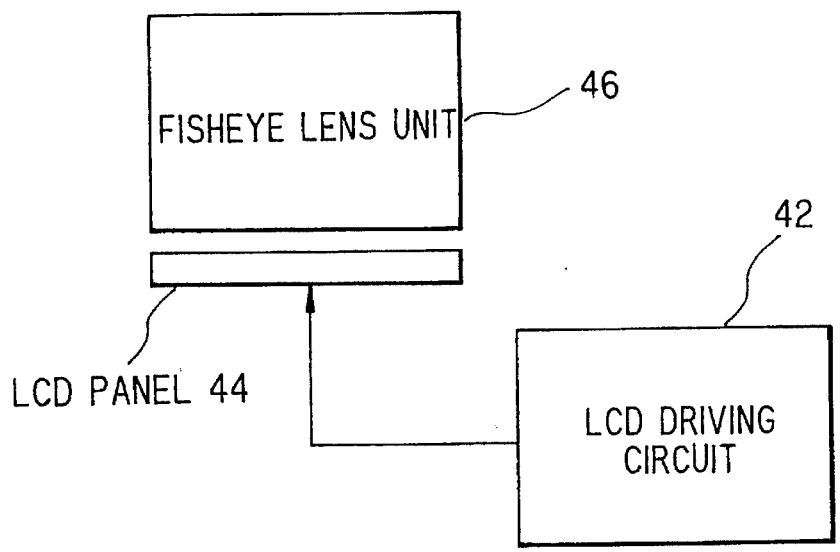
FIG. 4 is a diagram showing the construction of an example of the projection machine 20.
Figure 5:
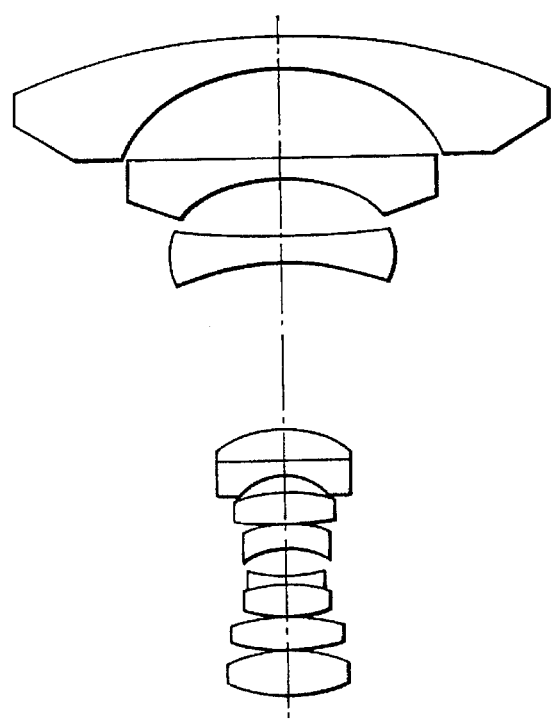
FIG. 5 is a diagram showing an example of a fisheye lens unit 46.

As shown in FIG. 4, the projection machine 18 includes an LCD driving circuit 42 for producing an LCD (liquid crystal display) driving signal from the video signal supplied from the video processing unit 8, an LCD panel 44 for displaying the picture in accordance with the LCD driving signal, and a fisheye lens unit 46 for projecting the picture displayed on the LCD panel 44 over a wide-angle range. The fisheye lens unit 46 may be designed in a well-known structure as shown in FIG. 5, for example.

The picture projected from the projection machine 18 is displayed on a spherical screen 24. The spherical screen 24 is designed so as to spherically extend from the upper side of the user in the front direction by about 90° and in the lateral direction by about 180°. The spherical screen 24 is fixedly secured to the seat 20 through a support member 26, and thus it is interlocked with the seat 24, that is, the spherical screen 24 is movable integrally with the seat 24.

The audio processing unit 10 in the control center CC conducts a predetermined processing on the 2-channel audio signal supplied from the decoder 6 and supplies the processed result to a speaker 16 in the control center CC and also to speakers 30 disposed at the right and left sides of the user 20 in each of all the amusement units AU1 to AUn.

Figure 6:
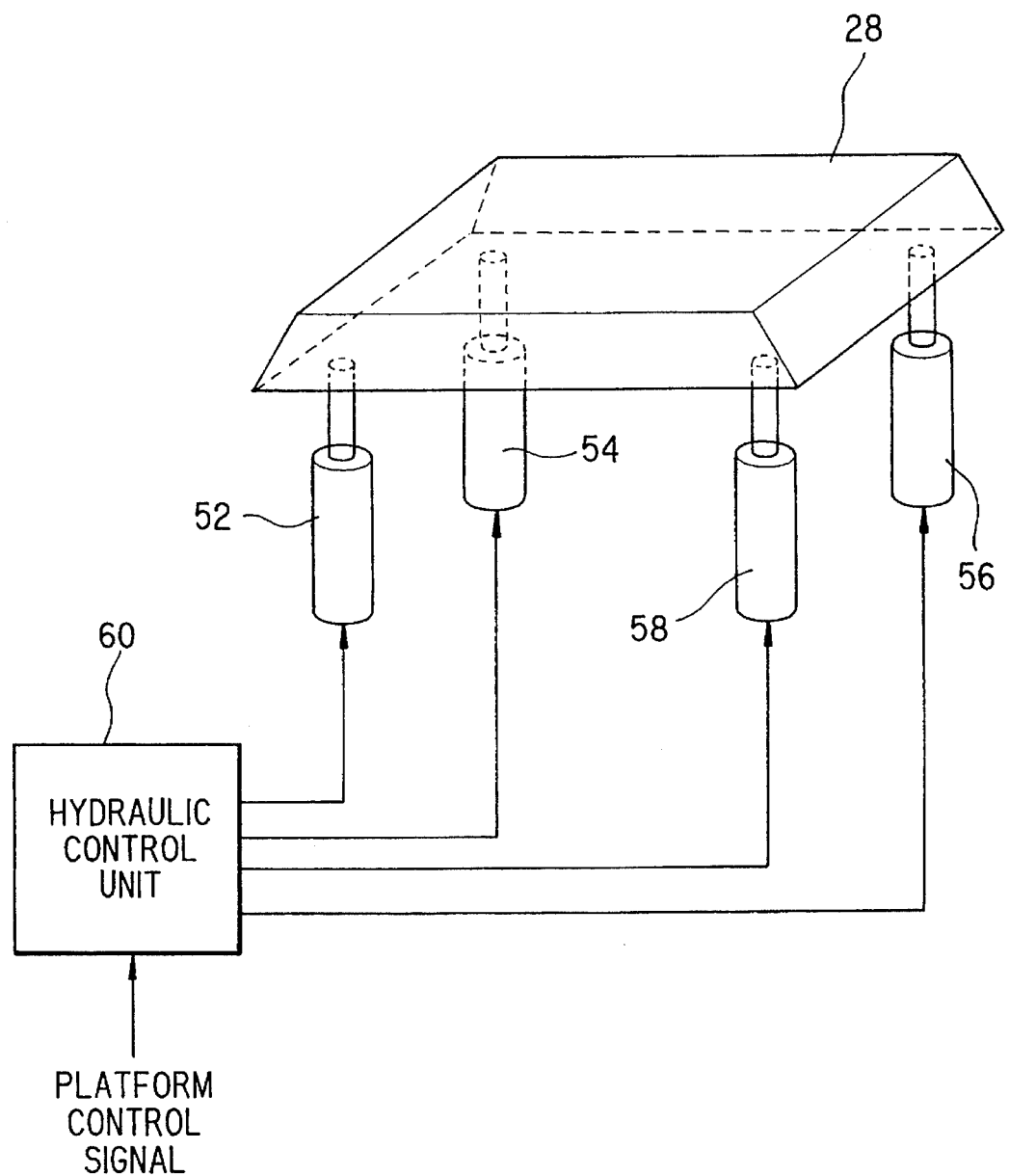
FIG. 6 is a diagram showing the construction of a platform driving machine 30.

The platform control unit 12 in the control center CC conducts a predetermined processing on the platform control signal supplied from the decoder 6 and supplies the processed result to the driving machines 32 of all the amusement units AU1 to AUn. The respective two seats 22 of each of the amusement units AU1 to AUn are fixedly secured to the platform 28. The platform 28 is moved by the driving machine 32. As shown in FIG. 6, the driving machine 32 includes four hydraulic cylinders 52, 54, 56 and 58 for independently moving four points of the platform 28, and a hydraulic control unit 60 for converting the platform control signal from the platform control unit 12 in the control center CC to a hydraulic control signal and supply the converted hydraulic control signal to the four hydraulic cylinders 52, 54, 56 and 58.

The hydraulic control unit 60 moves the four hydraulic cylinders 52, 54, 56 and 58 in accordance with the platform control signal, whereby the platform 28 can be moved in the right and left direction or the up-and-down direction, or can be tilted or vibrated.

As described above, the platform control signal is associated with the picture displayed on the screen 24, and the user 20 can experience such a virtual reality as if he actually flew in space.

Further, if various optical disks 2 having different stories are prepared, the user in the amusement unit can experience various kinds of virtual realities, and thus the amusement machine can satisfy any user's fancy.

Still further, since the system controller CC and each amusement unit are located away from each other and each amusement unit is designed to be suitably used for a few people, the space for the amusement unit can be reduced. The amusement unit as described above is designed in a one-system structure that a compact amusement room surrounding a ceiling, a floor and walls, a screen, seats, a platform, etc. are unified into one system.

Still further, since the video signal and the platform control signal are recorded on one recording medium such as an optical disk, the synchronization between the picture and the motion of the seats can be facilitated. The video signal and the platform control signal may be recorded on a recording medium other than the optical disk, such as a magnetic tape. However, the optical disk is superior to the magnetic tape in the point that an random access can be performed for the optical disk, that is, the starting and ending operations can be immediately performed.

In the above embodiment, the video signal recorded on the disk 2 is a video signal obtained by photographing using the fisheye lens. In place of this video signal may be used video signals which are obtained by divisionally photographing a wide-range picture using plural cameras and then are subjected to a pre-treatment so that they will correspond to a picture obtained by the photographing using a fisheye lens (i.e., pictures obtained by the plural cameras are beforehand deformed so that they form a normal picture when these pictures are projected through a fisheye lens at a reproducing operation) through a composite processing of these video signals.

The picture may be projected on the screen 24 through another optical system in place of the fisheye lens. In this case, the video signal recorded on the disk 2 may be a video signal which is obtained through the optical system or video signals which are obtained through the divisional photographing using plural cameras and then subjected to a pre-treatment so that they will correspond to a picture obtained by the photographing using the optical system (i.e, pictures obtained by the plural cameras are beforehand deformed so that they form a normal picture when these pictures are projected through the optical system at a reproducing operation) through a composite processing of these video signals.

In the above embodiment, the spherical screen 24 as shown in FIG. 1 is designed to extend from the upper side of the user in the front direction by 90° and in the lateral direction by 180°. In place of this spherical screen, a semi-spherical screen which is designed to extend from the upper side of the user to the lower side of the user, that is, extend from the upper side to the lower side by about 180° may be used.

In the above embodiment, the picture is displayed by projecting the picture from the projection machine 18 to the screen 24. However, the picture may be merely displayed on a CRT (Cathode Ray Tube) or an LCD (Liquid Crystal Display) (in this case, the video signal recorded on the disk 2 is not a video signal obtained through the photographing using a fisheye or some other optical system, but a video signal obtained by the photographing using a general camera).

The picture may be displayed in a three-dimensional display mode, that is, a stereographic display mode using a spectacle system. As the spectacle system may be used various types of systems such as a wavelength-separation type of color spectacle system for separating right and left images utilizing differences in wavelengths of light, a polarization-separation type of polarizing spectacle system for separating right and left images utilizing differences in polarizing states of light or a time-sharing type of spectacle system for alternately displaying right and left images while switching these images to each other.

Further, in the above embodiment, the 2-channel audio signal is used. However, it may be replaced by a 4-channel or 8-channel audio signal. In this case, the presence of sound is more improved.

Still further, in the above embodiment, the driving machine of the platform is constructed by four hydraulic cylinders. However, the platform may be rotated by a motor or the like.

Furthermore, in the above embodiment, the seats are indirectly moved by moving the platform, however, the seats may be directly moved.

The user is not necessarily required to sit on a seat, and he may be restrained by a support pole in a standing state. In this case, the support pole is secured to the platform, and the platform may be moved, or the support pole may be directly moved. At any rate, any means may be used insofar as motion can be supplied to the user.

If necessary, user's operation information such as moving information of a manipulation member such as a joy stick or a handle may be fed back to the control center as an operation signal to skip an address of the video signal in accordance with the operation signal, thereby generating a picture in accordance with an user's manipulation, or a control signal for the platform may be newly prepared to feed back the control signal to the platform driving machine.

In addition to the provision of the motion to the user, the amusement machine may be equipped with a fuming machine, a laser beam generator, a smell generating machine or the like, and a fuming control code for controlling the fuming machine, a laser beam control code for controlling the laser beam generator, a smell control code for controlling the smell generating machine, or the like may be recorded as addition control codes on the recording medium. Further, additive sound generating codes for imitation sound, bursting sound, etc. may be recorded on the recording medium.

In the above embodiment, the control center CC reproduces one disk to supply the same picture, sound and motion to all the amusement units. However, the control center CC may reproduce different plural disks to supply different pictures, sounds and motions to the respective amusement units.

Further, in the above embodiment, the control center CC is located separately from the amusement units AU1 to AUn, and the amusement units are remotely controlled by the control center CC. However, each element of the control center CC may be installed into each amusement unit. In this case, an user can selectively reproduce a disk having his desired content and enjoy himself.

Figure 7:
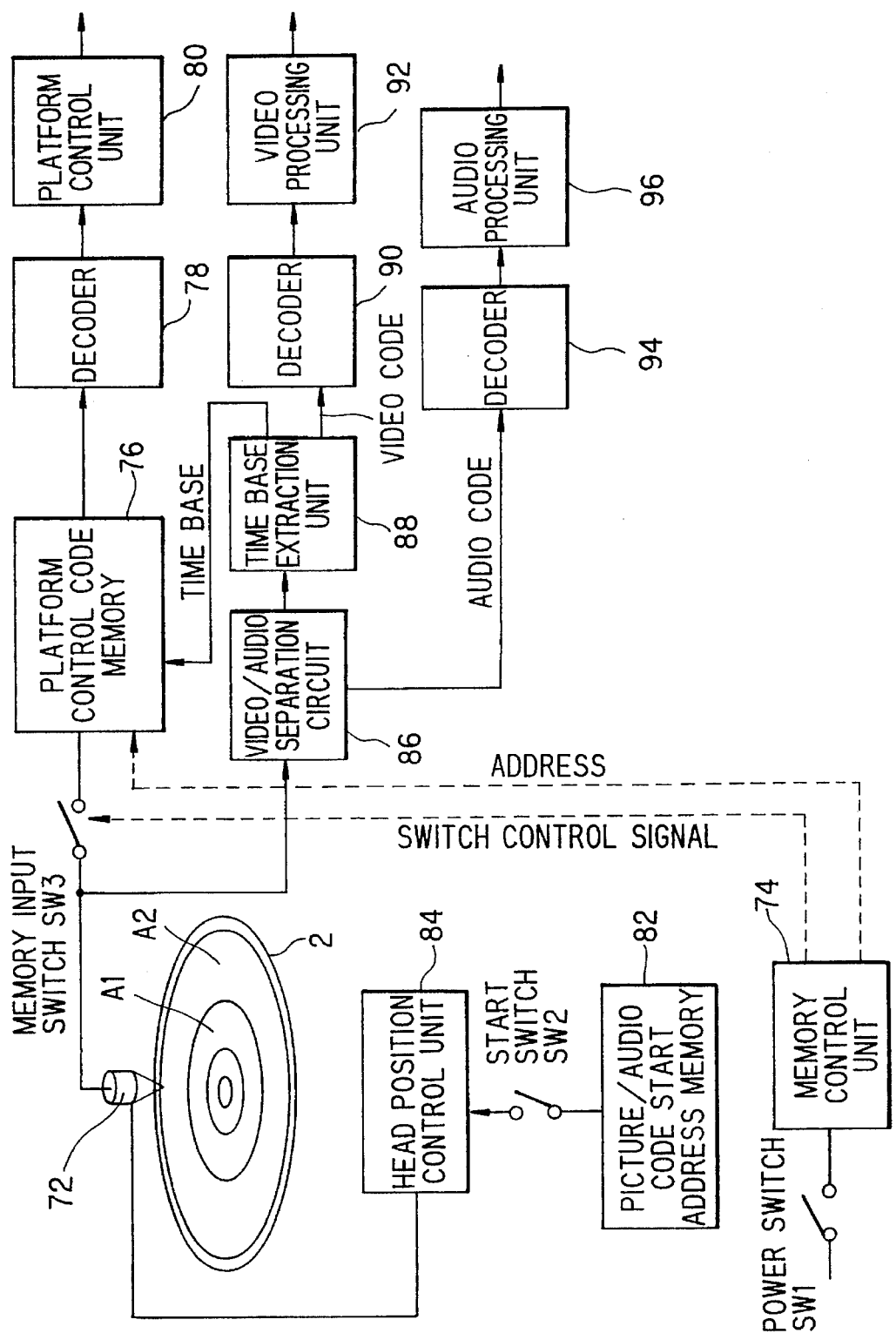
FIG. 7 is a block diagram for a first modification of a control center CC of the embodiment of the amusement system as shown in FIG. 1.
Figure 8:
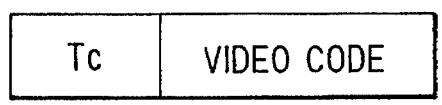
FIG. 8 is a diagram showing a recording format of a video code of an optical disk 2 in the modification as shown in FIG. 7.
Figure 9:
FIG. 9 is a diagram showing a recording format of a motion code of the optical disk 2, that is, a platform control code in the modification as shown in FIG. 7.

FIG. 7 shows a first modification of the control center CC of the embodiment of the amusement system as shown in FIG. 1. As shown in FIG. 7, a motion code, that is, a platform control code is recorded at a small area A1 at the inner peripheral side of a Hi-vision optical disk 2, and both of a video code and an audio code are recorded at a large area A2 of the outer peripheral side of the optical disk 2. The video code includes a time base code Tc corresponding thereto as shown in FIG. 8, and the motion code (i.e., the platform control code) includes a timing base code Tc corresponding thereto as shown in FIG. 9.

Upon switch-on of a power switch SW1, a pickup 72 successively traces the optical disk 2 from a top address of the area A1 to a last address of the area A1 under the control of a head position control unit 84 to reproduce a platform control code and a time base code. In addition, upon switch-on of the power switch SW1, a memory control unit 74 supplies an ON indicating signal to a memory input switch SW3, and successively supplies a series of address signals to a platform control code memory 76. Through this operation, the platform control code and the time base code which are reproduced by the pickup 72 are stored in the memory 76. When terminating the supply of the series of address signals to the memory 76, the memory control unit 74 supplies an OFF indicating signal to the switch SW3, whereby the switch SW3 is switched off.

Subsequently, upon switch-on of a start switch SW2, a picture/audio code start address stored in a memory 82 is supplied through a switch sW2 to the head position control unit 84. The head position control unit 84 serves to position the pickup 72 to picture/audio code start address of the area A2 on the optical disk 2. The pickup 72 traces the optical head 2 from the picture/audio code start address of the area A4 to the last address thereof under the control of the head position control unit 84, thereby reproducing the video code, the time base code and the audio code.

The video code and the time base code which are reproduced by the pickup 72 are supplied to a time base extraction unit 88 by a video/audio separation circuit 86. The time base extraction unit 88 supplies the video code to a decoder 90 and also supplies the time code base added to the video code to the platform control code memory 76. Through this operation, the platform control code memory 76 outputs a platform control code, that is, a motion code which is added with the same time code as the time base code supplied from the extraction unit 88. Accordingly, the platform control code and the video code are supplied from the platform control code memory 76 and the time base extraction unit 88 to the decoders 78 and 90 respectively while synchronized with each other.

The audio code reproduced by the pickup 72 is supplied from the video/audio separation circuit 86 to a decoder 94. The decoders 78, 90 and 94 serve to decode the platform control code, the video code and the audio code respectively to output the platform control signal, the video signal and the audio signal. A platform control unit 80, a video processing unit 92 and an audio processing unit 96 conduct the same processings as the platform control unit 12, the video processing unit 8 and the audio processing unit 10 as shown in FIG. 1, respectively.

Figure 10:
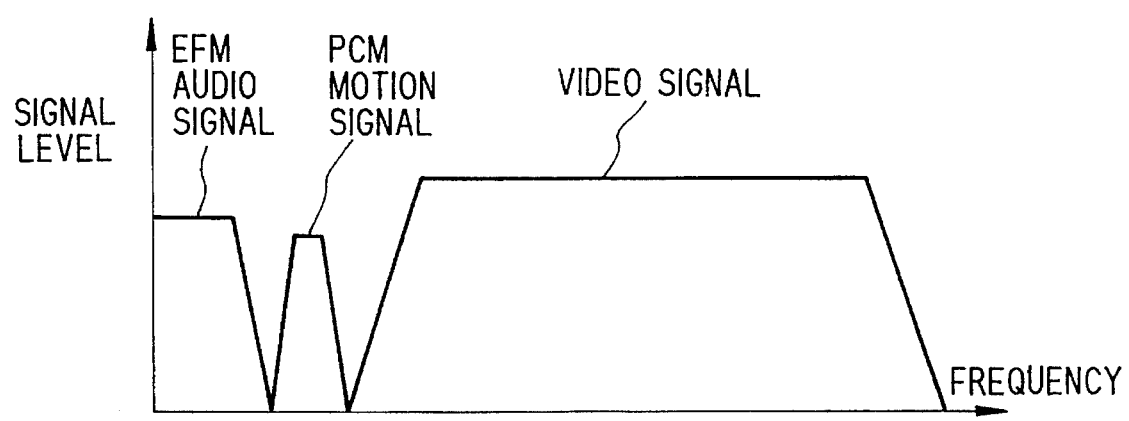
FIG. 10 is a diagram showing frequency allocation of an audio signal, a motion signal and a video signal in the modification as shown in FIG. 7.

FIG. 10 is a diagram showing frequency allocation of the audio signal, the motion signal and the video signal in the modification as shown in FIG. 7. In the frequency diagram as shown in FIG. 7, the audio signal which is recorded as an EFM signal is located at the lowest frequency band area. The video signal is located at the highest frequency band area, and the platform control signal, that is, the motion signal and the time base signal which are PCM signals are located at an intermediate area between the frequency band area of the audio signal and the frequency band area of the video signal. The audio signal, the motion signal and the time base signal are multiplied during a vertical blanking period of the video signal.

Figure 11:
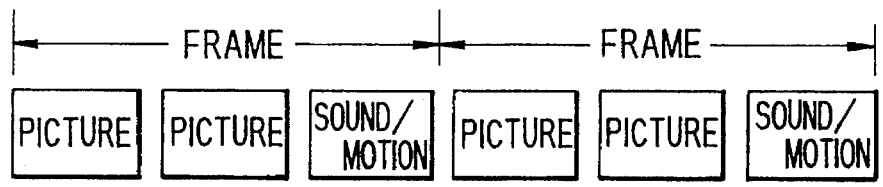
FIG. 11 is a diagram of an example of the recording format when the recording density of the optical disk 2 is increased 1.5 times.

FIG. 11 is a diagram showing an example of a recording format when the recording density of the Hi-vision optical disk 2 is increased 1.5 times. In this format, two video codes and one audio or motion code are contained in one frame. That is, in this example, the video code and the audio/motion code are multiplied on a time axis. Here, "audio/motion" means any one of the audio code and the motion code, or both codes.

Figure 12:
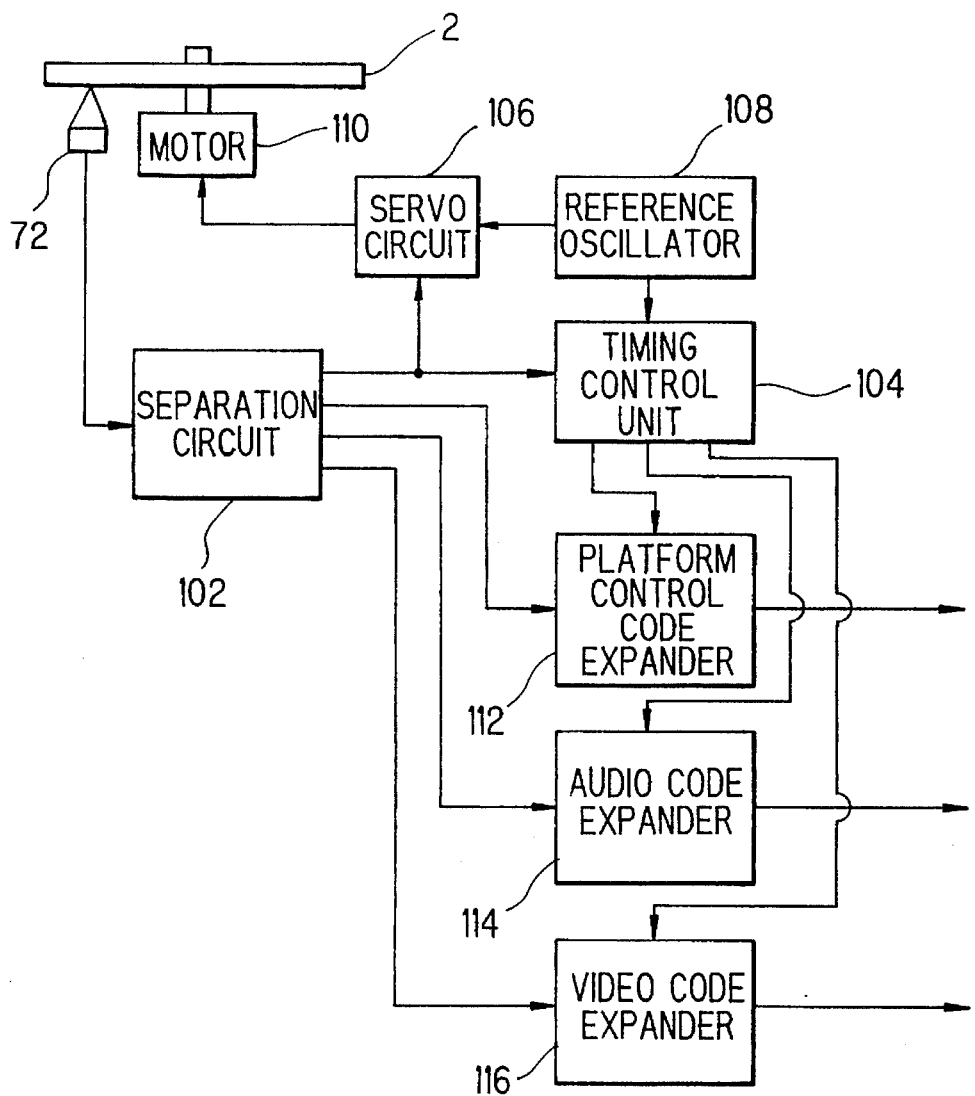
FIG. 12 is a block diagram showing a second modification of the control center CC corresponding to the recording format as shown in FIG. 11.

FIG. 12 is a block diagram showing a second modification of the control center CC which corresponds to the recording format as shown in FIG. 11. The pickup 72 supplies a reproduced signal of the Hi-vision optical disk 2 to a separation circuit 102. The separation circuit 102 serves to separate the signal supplied from the pickup 102, supply a time-axis variation clock signal to a timing control unit 104 and a servo circuit 106, supply a platform control code to a platform control code expander 112, supply an audio code to an audio code expander 114, and supply a video code to a video code expander 116.

The servo circuit 106 compares the time-axis variation clock signal from the separation circuit 102 with a reference clock signal from a reference oscillator to control the rotation of a driving motor 110 for the Hi-vision optical disk 2.

Figure 13:
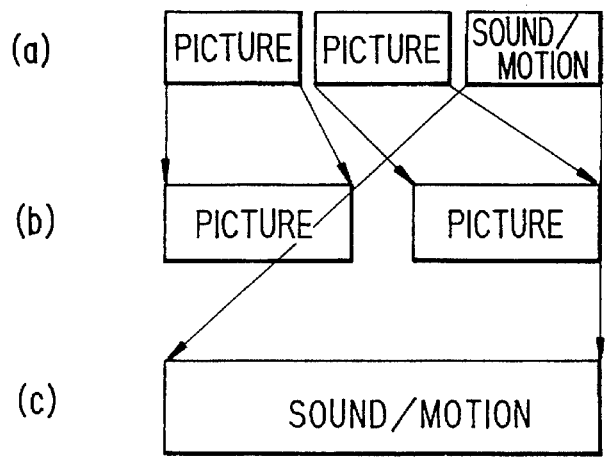
FIGS. 13(a), (b) and (c) are diagrams showing the operation of expanders 112, 114 and 116.

The timing control unit 104 receives the time-axis variation clock from the separation circuit 102 and the reference clock signal from the reference oscillator 108 to output timing control signals to the platform control code expander 112, the audio code expander 114 and the video code expander 116, respectively. The platform control code expander 112, the audio code expander 114 and the video code expander 116 output the platform control code, the audio code and the video code in accordance with the input timing control signals to meet the corresponding timings of the picture, sound and motion as shown in FIG. 13.

Figure 14:
FIG. 14 is a diagram showing an example of the recording format when the recording density of the optical disk 2 is inched twice.

The construction of the control center CC as shown in FIG. 12 is not limited to the recording format as shown in FIG. 11, but applicable to a recording format in which a video code and an audio/motion code are generally multiplied on a time axis, for example, a recording format as shown in FIG. 14. FIG. 14 is a diagram showing an example of the recording format when the recording density of the Hi-vision optical disk 2 is increased twice. In this format, one video code and one "audio/motion" code are contained in one frame.

Figure 15:
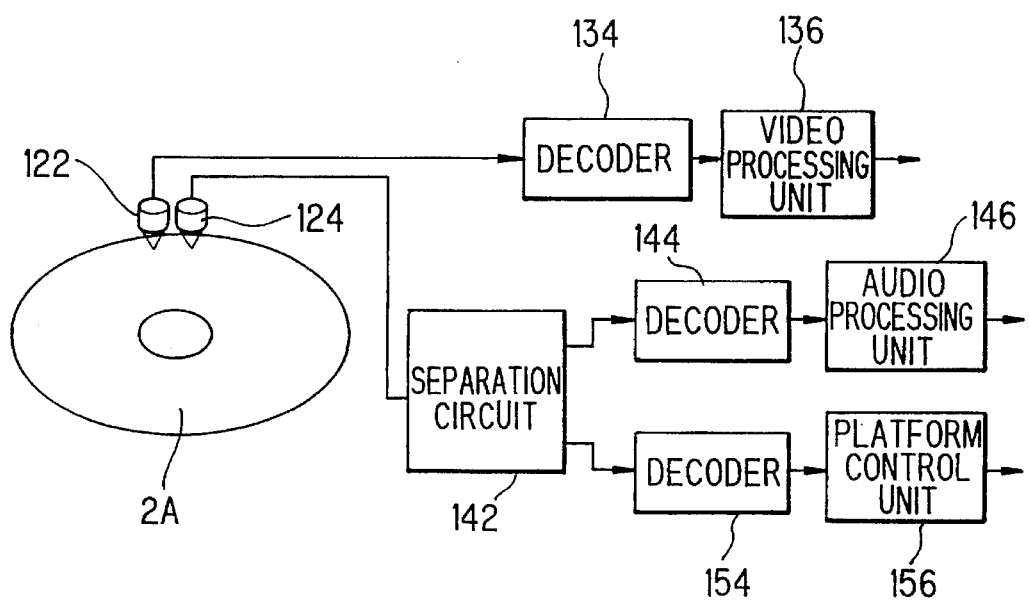
FIG. 15 is a schematic diagram partially containing a block diagram for a third modification of the control center CC when a 2-beam and double-track type of optical disk is used.
Figure 16:
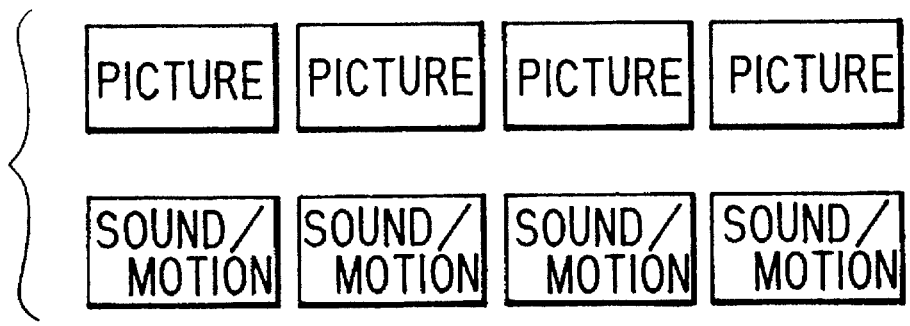
FIG. 16 is a diagram showing an example of the recording format corresponding to the 2-beam and double track type of optical disk.

FIG. 15 is a block diagram showing a third modification of the control center CC using a 2-beam and double track type of Hi-vision optical disk. As shown in FIG. 16, a video code is recorded on one of two neighboring tracks of the Hi-vision optical disk 2A, and an audio code and a motion code are recorded on the other track.

Referring to FIG. 15, a pickup 122 reproduces the video code from the one track of the double track while a pickup 124 reproduces the audio code and the motion code, that is, the platform control code from the other track.

The video code which is reproduced by the pickup 122 is supplied to a decoder 134. The audio code and the platform control code which are reproduced by the pickup 124 are supplied to decoders 144 and 154 respectively by the separation circuit 142. The decoders 134, 144 and 154 serve to decode the video code, the audio code and the platform control code to output the platform control signal, the video signal and the audio signal. The video processing unit 136, the audio processing unit 146 and the platform control unit 156 conduct the same processings as the platform control unit 12, the video processing unit 8 and the audio processing unit 10 as shown in FIG. 1.

Figure 17:
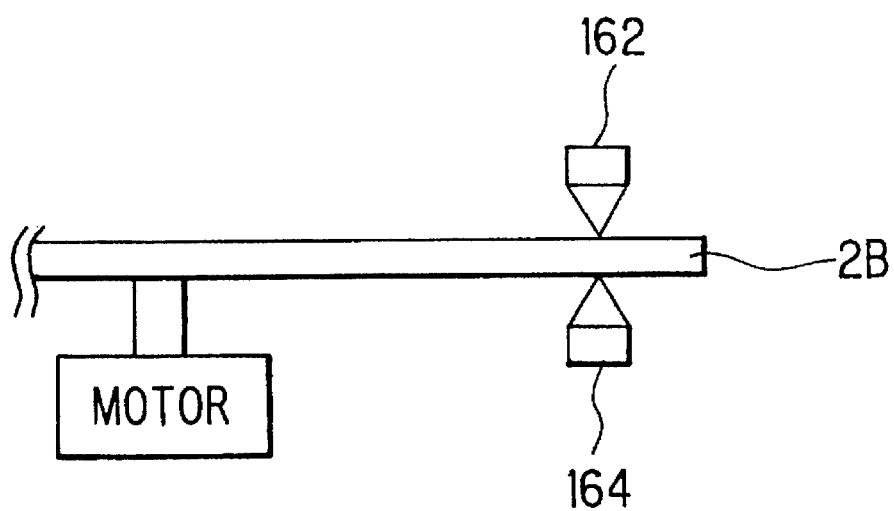
FIG. 17 is a diagram for a double-side recordable optical disk which is usable in place of the optical disk of 2-beam and double-track type as shown in FIG. 15.

FIG. 17 is a diagram showing a Hi-vision double-side recordable optical disk which is usable in place of the 2-beam and double track optical disk 2A. In this case, as shown in FIG. 16, a video code is recorded on one of two tracks corresponding to both surfaces of the Hi-vision double-side recordable disk 2B, and an audio code and a motion code are recorded on the other track. Referring to FIG. 17, a pickup 162 reproduces the video code from the tracks of the optical disk 2B while a pickup 164 reproduces the audio code and the motion code, that is, the platform control code from the tracks of the optical disk 2B.

The video code reproduced by the pickup 162 is supplied to a decoder similar to the decoder 134 as shown in FIG. 15. The audio code and the platform control code reproduced by the pickup 124 are supplied to a separation circuit similar to the separation circuit as shown in FIG. 15. Subsequently, the same operation as the case as shown in FIG. 15 is carried out.

According to the amusement machine of this invention, the display and the motion providing means are controlled by reproducing a recording medium recorded with a signal representing a picture for display to a user and a control signal for controlling the motion providing means for moving the user. Therefore, the picture display for the user and the motion of the user can be easily synchronized with each other.

Further, the display and the motion providing means are installed into one unit, and these elements are located separately from the control means for controlling these means, so that the amusement machine can be miniaturized.

Still further, if a large number of recording media having different information concerning pictures and motion are prepared, the amusement machine can satisfy various user's fancy. If the recording medium comprises an optical disk, the starting and ending operation of the amusement machine can be immediately performed.

What is claimed is:

1. An amusement machine for displaying a picture to a user and allowing the user to be bodily sensate to a provided motion, including:

a display for displaying the picture to the user, the display including a screen positioned in front of the user and a projector positioned on a front side of the screen whereat the user is located and in line-of-sight communication with the screen;

support means for supporting the user, the screen being fixedly connected to said support means;

motion providing means for moving the support means and the screen and for providing the user with a sense of bodily motion;

a disk-shaped recording medium on which a video signal representing the picture displayed on said display and a control signal for controlling said motion providing means are recorded; and means for reproducing the video signal and the control signal from said disk-shaped recording medium and for controlling said display and said motion providing means, wherein both of the video signal and the control signal associated with the video signal are recorded as code information on the disk-shaped recording medium, the video signal and the control signal being arranged in frames so as to be synchronized with each other upon reproducing, wherein said disk-shaped recording medium has a first annular area on which a control signal for controlling said motion providing means is continuously recorded and a second annular area on which a signal representing the picture is continuously recorded, and wherein said means for reproducing and controlling includes storing means for storing the control signal reproduced from the first annular area and synchronizing means for outputting the control signal from said storing means in synchronism with the signal representing the picture reproduced from the second annular area.

2. The amusement machine as claimed in claim 1, further including timing control means for controlling driving said display and said motion providing means interlockingly with each other.

3. The amusement machine as claimed in claim 2, further comprising means for mounting said display and said motion providing means integrally with each other.

4. The amusement machine as claimed in claim 1, wherein said motion providing means includes a seat and said display includes a display screen linked to said seat.

5. The amusement machine as claimed in claim 1, wherein said screen is a spherical screen.

6. The amusement machine as claimed in claim 5, wherein said projection means includes a fisheye lens and the picture is projected through said fisheye lens.

7. The amusement machine as claimed in claim 1, wherein said recording medium has a first area on which a control signal for controlling said motion providing means is continuously recorded, and a second area on which a signal representing the picture is continuously recorded, and wherein said means for reproducing and controlling includes storing means for storing the control signal reproduced from the first area and synchronizing means for outputting the control signal from said storing means in synchronism with the signal representing the picture reproduced from the second area.

8. The amusement machine as claimed in claim 1, wherein said recording medium has a first track on which the control signal for controlling said motion providing means is recorded, and a second track on which the signal representing the picture is recorded, and wherein said means for reproducing and controlling includes dual head reproducing means for simultaneously reproducing the control signal and the signal representing the picture from said first and second tracks of said recording medium.

9. An amusement machine for displaying a picture to a user and allowing the user to be bodily sensate to a provided motion, including:

a display for displaying the picture to the user, the display including a screen positioned in front of the user and a projector positioned on a front side of the screen whereat the user is located and in line-of-sight communication with the screen;

support means for supporting the user, the screen being fixedly connected to said support means;

motion providing means for moving the support means and the screen and for providing the user with a sense of bodily motion;

a disk-shaped recording medium on which a video signal representing the picture displayed on said display and a control signal for controlling said motion providing means are recorded; and means for reproducing the video signal and the control signal from said disk-shaped recording medium and for controlling said display and said motion providing means, wherein the recording medium comprises a disk-shaped medium and both of the video signal and the control signal associated with the video signal are recorded as code information on the disk-shaped medium, the video signal and the control signal being arranged in frames so as to be synchronized with each other upon reproducing, wherein the control signal for controlling said motion providing means and the signal representing the picture are multiplied on a time axis and recorded on said recording medium, and wherein said means for reproducing and controlling includes timing control means for controlling the timing of the control signal reproduced form said recording medium and the timing of the signal representing the picture reproduced from sid recording medium so as to be in mutual synchronism.

10. An amusement unit for displaying a picture to a user and enabling the user to be bodily sensate to a provided motion, including:

a display for displaying the picture to the user, the display including a screen positioned in front of the user and a projector positioned on a front side of the screen whereat the user is located and in line-of-sight communication with the screen;

support means for supporting the user, the screen being fixedly connected with said support means;

motion providing means for moving the support and the display and for providing a sense of bodily motion to the user;

driving means for driving said display and said motion providing means so as to be interlocked with each other, said display, said motion providing means and said driving means being disposed at a first location; and means for reproducing from a disk-shaped record medium a video signal representing the picture to be displayed on said display and a control signal for controlling said motion providing means from respective first and second annular areas on said disk-shaped recording medium and including a control center which is located separately from said driving means at a second location, said means for producing includes storing means for storing the control Signal reproduced from the second annular area and synchronizing means for outputting the control signal in synchronism with the signal representing the picture reproduced from said first annular area on said disk-shaped recording medium.

11. An amusement system including plural amusement units for independently displaying any one of a plurality of pictures to one or more users in each of the plural amusement units and enabling the users to be bodily sensate to a provided motion in each of the plural amusement units, said provided motion in each of the plural amusement units being independent of each of the other amusement units;

picture display means for displaying the picture to the users in each amusement unit, the picture display means including a screen positioned in front of the users in each respective amusement unit and a projector positioned on a front side of the screen whereat the users are located and in line-of-sight communication with the screen;

support means for supporting the users in each respective plural amusement unit, the screen being fixedly connected with said support means;

motion providing means for moving the support and the display of each amusement unit and providing a sense of bodily motion to the users, said picture display means and said motion providing means being arranged together in each amusement unit; and a control center which is located separately from said plural amusement units and equipped with a disk-shaped recording medium on which the picture displayed on said picture display means and a control signal for controlling said motion providing means are recorded, and including means for reproducing said disk-shaped recording medium and for controlling said picture display means and said motion providing means so as to operate synchronously and further including storing means for storing the control signal reproduced from the disk-shaped recording medium and synchronizing means for outputting the control signal from the storing means in synchronism with the signal representing the reproduced picture.

* * * * *

UNITED STATES PATENT AND TRADEMARK OFFICE
CERTIFICATE OF CORRECTION

PATENT NO. : 5,486,141
DATED : January 23, 1996
INVENTOR(S) : Norio Ohga and Koichi Takeuchi It is certified that error appears in the above-identified patent and that said Letters Patent is hereby corrected as shown below:

Col.2, line 63, change "inched" to --increased--

In the claims:
Col.10, line 65, change "Signal" to --signal--

Signed and Sealed this

Sixteenth Day of June, 1998

Attest:

BRUCE LEHMAN

Attesting Officer                    *Commissioner of Patents and Trademarks*